UNITED STATES PATENT OFFICE.

CARLETON ELLIS AND ALFRED A. WELLS, OF MONTCLAIR, NEW JERSEY, ASSIGNORS, BY MESNE ASSIGNMENTS, TO NATIONAL CARBON COMPANY, OF LONG ISLAND CITY, NEW YORK, A CORPORATION OF NEW JERSEY.

PROCESS OF MAKING CONDUCTING HYDRATED BLACK MANGANESE DIOXID.

1,269,914.     Specification of Letters Patent.     Patented June 18, 1918.

No Drawing. Application filed December 2, 1915, Serial No. 64,790. Renewed February 8, 1918. Serial No. 216,122.

*To all whom it may concern:*

Be it known that we, CARLETON ELLIS and ALFRED A. WELLS, citizens of the United States, and residents of Montclair, in the county of Essex and State of New Jersey, have invented certain new and useful Improvements in Processes of Making Conducting Hydrated Black Manganese Dioxid, of which the following is a specification.

This invention relates to a method of making hydrated manganese dioxid suitable for various chemical operations and also as a depolarizer for batteries of the Leclanché type.

The invention specifically relates to a method of making deep black good conducting hydrated manganese dioxid depolarizing material and to the production of such material of good quality and in good yield from a cheap manganese salt such as manganese sulfate by oxidation with sodium hypochlorite or similar oxidizing agent. If hypochlorite solution is allowed to act on manganese sulfate in the cold in neutral or alkaline solution a brownish precipitate is obtained which contains some dioxid apparently mingled with other products. If the hypochlorite in boiling solution of acid reaction is allowed to act on the sulfate a small amount of deep black good conducting hydrated manganese dioxid forms but the yield is very small and the rate of formation is slow. A large amount of manganese remains in solution. The formation of the dioxid is retarded by the presence of excessive amounts of free acid and after reaching a certain concentration the acid prevents any further formation of the dioxid. If the solution is alkaline a brown product is obtained instead of the deep black material. By keeping the solution only slightly acid the deep black product is formed in almost completely quantitative yield especially when the solution is maintained at about the boiling point. The solution may be kept in the requisite stage of slight acidity (usually $\frac{1}{4}$ to $\frac{1}{2}$%) by the addition from time to time of small amounts of sodium carbonate solution, or other adjusting reagent capable of modifying the degree of acidity so as to maintain the solution slightly acid in character but not sufficiently acid to stop the progress of the reaction. An illustrative example is the following:—

A solution of manganous sulfate was heated and to it was added in small portions from time to time while heating to boiling point, a solution of sodium hypochlorite which had been prepared by passing chlorin into caustic soda solution until the alkalinity was neutralized. Sodium carbonate solution was added at intervals to keep the reaction mass only slightly acid during the oxidation stage. Care was taken to keep the solution acid to a slight degree. The manganese sulfate was thus substantially completely converted into the deep black good conducting hydrate of higher oxid of manganese. The black powder obtained by drying the material was found to be so good a conductor that sufficient current passed through a short column of it to ring an electric bell.

When using manganese chlorid instead of the sulfate the hydrochloric acid being volatile tends to keep the solution below the requisite degree of acidity when the solution is kept at the boiling point and a brown precipitate is likely to form. In this case the adjusting reagent is of an acid instead of an alkaline character. The addition of an acid such as hydrochloric acid under these conditions is necessary from time to time in order to maintain the conditions for the formation of the deep black product. At lower temperatures less acid is added or none at all. Thus the invention involves the adjustment of the degree of acidity according to the initial conditions and this may require the addition of an alkili or other base or in special cases of an acid and such additions may take place progressively from time to time to maintain the required acid strength.

Manganese carbonate preferably freshly precipitated may be used in the place of sodium carbonate to take care of the excess of sulfuric acid in the case of the use of manganese sulfate.

The product should be well washed to remove soluble salts and in fact it is desired to free from such saline material to an extent that the conductivity of the distilled water is not materially changed on the addition of one or two per cent. of the hydrated manganese dioxid. By purification to this degree a product is obtained which is stable in the cell and is not likely to local action causing expansion and sprouting of the cell contents, that is to say, the ejection of the wax seal and contents immediately beneath this out of the cell is avoided.

The preferred final product is of a deep black color, is well hydrated and does not part with its water of hydration readily even when heated rather strongly. It conducts an electric current quite readily, hence is eminently suited for use in dry batteries as a depolarizer where its good conducting properties are beneficial.

What we claim is:—

1. The process of making black conducting hydrated manganese dioxid depolarizing material which comprises oxidizing manganese sulfate with sodium hypochlorite in a solution of approximately a one fourth of one per cent. acidity.

2. The process of making black conducting hydrated manganese dioxid which comprises oxidizing a manganese salt with sodium hypochlorite material in an acid solution not exceeding one half of one per cent. of acidity.

3. The process of making black conducting hydrated manganese dioxid which comprises subjecting a manganese salt in slightly acid solution to the oxidizing action of hypochlorite material and in progressively neutralizing the excess of acid to maintain a slight degree of acidity whereby the black product is formed in substantially quantitative yield.

4. The process of making deep black good conducting hydrated manganese dioxid which comprises subjecting manganese sulfate in slightly acid solution to the oxidizing action of hypochlorite material and in progressively neutralizing the excess of acid to maintain a slight degree of acidity whereby the black product is formed in substantially quantitative yield.

5. In the process of making black conducting hydrated manganese dioxid depolarizing material, the step which comprises maintaining a solution in which a manganese salt is being oxidized at an acid strength not to exceed one half of one per cent.

6. In the process of making black conducting hydrated manganese dioxid the step which comprises treating a hot solution in which a manganese salt is being oxidized and free acid is thereby being liberated, with a neutralizing agent, whereby the solution is maintained slightly acid in character and the presence of a degree of acidity sufficient to check the progress of the reaction is precluded.

7. In the process of making black conducting hydrated manganese dioxid the step which comprises treating a solution in which manganese sulfate is being oxidized and sulfuric acid is thereby being liberated, with a neutralizing agent; whereby the solution is maintained slightly acid in character but not sufficiently acid to check the progress of the reaction.

8. In the process of making black conducting hydrated manganese dioxid the step which comprises subjecting a solution in which a soluble manganese salt is being oxidized to the action of an adjusting reagent capable of modifying the degree of acidity so as to maintain the solution slightly acid in character but not sufficiently acid to check the progress of the reaction.

CARLETON ELLIS.
ALFRED A. WELLS.